Feb. 27, 1968   G. NEUGEBAUER   3,370,470

SEALING ARRANGEMENT FOR LIQUID-FILLED MANOMETER CASING

Filed Aug. 26, 1965

INVENTOR.
GERHARD NEUGEBAUER
BY Kurt Kelman
AGENT

United States Patent Office 3,370,470
Patented Feb. 27, 1968

3,370,470
SEALING ARRANGEMENT FOR LIQUID-FILLED MANOMETER CASING
Gerhard Neugebauer, 37 An der Alten Strasse, 8761 Trennfurt (Main), Germany
Filed Aug. 26, 1965, Ser. No. 483,396
6 Claims. (Cl. 73—431)

ABSTRACT OF THE DISCLOSURE

A transparent cover disc is placed on the upper edge of a liquid-filled manometer casing, with a sealing ring positioned in an annular groove in the upper edge. The disc is clamped onto the casing with a snugly fitting ring having a rear part inwardly bent to engage an annular groove in the exterior of the annular casing wall and a front part inwardly bent over the rim of the disc.

---

The present invention relates to manometers, especially to manometers the casing of which is filled with a liquid, for example glycerin, to damp oscillations of the pressure indicating device.

More particularly, the invention consists in new and useful improvements in a manometer, the casing of which has a special form to ensure the required tightness.

Such manometers consist of a pot-like casing in which are arranged the pressure indicating and pressure transferring elements. The front side opening of the casing is provided with a dial and in front of the dial is placed, in a certain distance apart from it, a transparent disc, for example, a disc of glass or of a synthetic material such, for example, as polymeric methacrylic acid methyl ester. Since such manometers are filled with a liquid, they involve the problem of how to make the inner space with the disc tight to the liquid, because the liquid not only fills the innermost space of the casing but also the space between the dial and the transparent disc.

Accordingly, it is an object of the invention to provide a manometer in which this sealing is effected in an effective and simple manner.

It is another object of the invention to provide a manometer in which the sealing elements are covered by a covering part slid over the casing.

It is another object of the invention to provide a manometer in which the sealing is effected by a simple clamping device which clamps together the manometer casing and the transparent disc, between which parts is placed, at their peripheral zone, a sealing ring.

Furthermore, it is an object of the invention to provide a manometer in which the sealing is achieved without using a flange and a flange cover ring and without screwing connection of the flange parts.

Finally, it is an object of the invention to provide a manometer the sealing elements of which can be manufactured and mounted in a simple and inexpensive manner.

These objects are met by the manometer of the present invention which is filled with a liquid to damp oscillations of the pressure indicating elements, which comprises a casing having an annular outer wall and a rear wall, pressure indicating elements with a graduated dial, a transparent covering disc placed in front of and spaced from said dial, a sealing element between the transparent disc and the upper edge of the casing, and a clamping element slid over portions of the casing and the disc, said upper edge of the casing being provided with a first annular groove in which is imbedded the said sealing element, said annular casing wall being furthermore provided with a second annular groove spaced from the said first groove, said clamping element consisting of a clamping ring having an external diameter which corresponds to the external diameter of the annular casing wall extending from the rear wall to the said second annular groove and having an internal diameter which corresponds to the external diameter of the annular casing wall extending from the said second annular groove to the said first annular groove and to the external diameter of the said transparent disc, said clamping element having a rear end part and a front part, said rear end part being bent radially and inwardly into the said second annular groove and said front part being bent radially and inwardly over said transparent disc.

With the above and other objects in view which will appear as the description proceeds, the invention consists in the novel features herein set forth, illustrated in the accompanying drawings and more particularly pointed out in the appended claims.

Referring to the drawings, in which like numerals designate similar parts throughout the several views.

Figure 1:
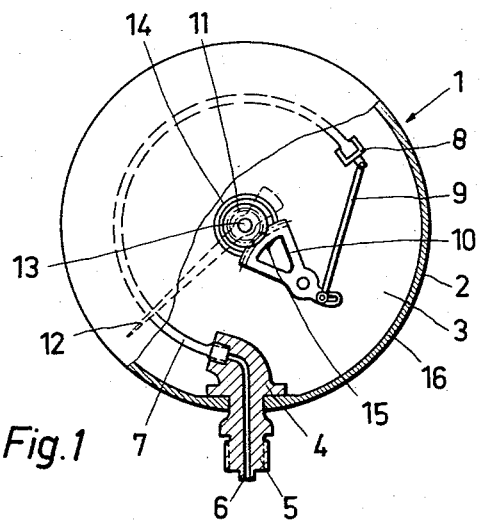
FIGURE 1 shows a view of the manometer casing with the pressure transferring elements arranged therein, the dial and the casing cover with the transparent disc being removed.

In the drawings, referring first to FIG. 1, the manometer comprises a pot-like casing 1 which has an annular side wall 2 and a circular rear wall 3. Side wall 2 and rear wall 3 are preferably made out of one piece. In the lower part of the casing is placed a connecting piece 4 which has at the outside of the casing a threaded connection 5 with a bore 6 for the introduction of the pressure medium. The internal part of the connecting piece is connected pressure tightly to a hollow, bent pressure spring 7. The end 8 of this pressure spring 7 is connected by links 9, 10 with a small toothed wheel 11 which, together with the pointer 12 shown in dotted lines, is keyed to stub shaft 13. A spiral spring 14 is attached with one end to shaft 13 or to the toothed wheel 11 and with the other end at 15 to the rear wall 3 of the casing. This pressure indicating device has been described for illustration only and may have any other form.

Figure 2:
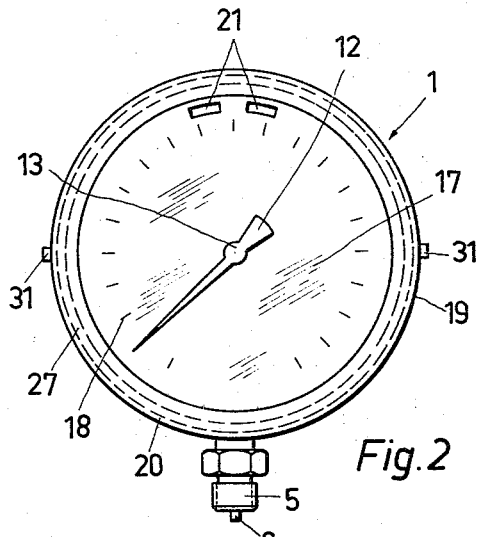
FIGURE 2 shows a view of the assembled manometer, as it may be connected to a pressure measuring point.
Figure 3:
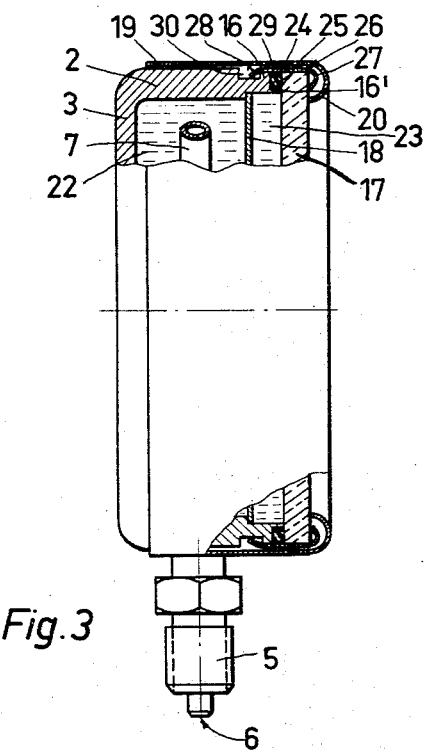
FIGURE 3 shows partially a sectional view and partially a side view of the manometer.

FIG. 2 shows the assembled manometer ready for installation, and it also shows the disc 17 placed on edge 16 (see FIG. 1) of the casing over the dial 18 (see also FIG. 3). Over the casing is placed cover sleeve 19 which overlaps disc 17 with its bent-over rim 20. Openings 21 in the dial disc 18 serve for compensating the liquid level in the chambers 22, 23 and permit small bubbles of air enclosed in both chambers 22, 23 to combine to a large air bubble in the upper part of the manometer. The sealing of the chambers 22, 23 is effected by disc 17 and the sealing ring 24 which is preferably a standard-sized, so-called rubber O-ring.

FIG. 3 shows this O-ring in deformed state. The cross-sectional diameter of the ring 24 is of course greater than the height of rim 16′ at the edge 16 of the casing. Disc 17 together with the O-ring 24, which is positioned in the groove 25 limited by rim 16′ and edge 16 of the casing, are compressed by clamping ring 26. This ring 26 consists preferably of a thin copper sheet and has an upper part 27, a lower part 28 and a central part 29.

The upper part 27 is stamped out in the form shown at the same time ring 26 is made. Lower part 28 is not yet bent then, but extends along the same annular plane as central part 29. Annular side wall 2 of the casing is provided with annular groove 30. Ring 26 has such a width that, when it is mounted, its lower part 28 overlaps annular groove 30.

For assembling the manometer, first the O-ring 24 is placed into groove 25 and then disc 17 is placed over the O-ring. Ring 26 is then slid over disc 17 and over the O-ring position below this disc, and lower part 28 is flanged into the annular groove 30, while compressing the said parts. The external diameter of edge 16 of the casing corresponds, with a certain tolerance, to the internal diameter of ring 26 and to the external diameter of disc 17. The external diameter of the annular casing wall 2 is the same as the external diameter of ring 26, so that the external face of the ring, when mounted, is level with the external face of annular wall 2 of the casing, thus forming one annular plane.

This assembled device is provided with casing cover 19 having an annular rim 20; this cover 19 is pushed from the front side over the casing. It is suitable to fasten it to the casing by two small screws 31 (FIG. 2).

Figure 4:
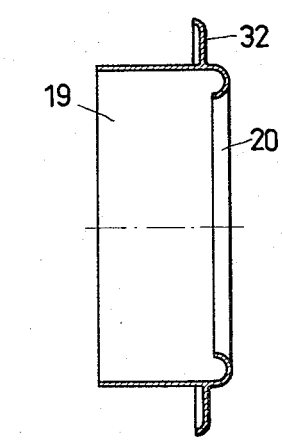
FIGURE 4 shows a partial section through a zone of the casing edge of a modified embodiment.

FIG. 4 shows a modification of the invention, in which groove 25 is limited towards the interior by rim 16' and towards the exterior by another rim 16". Rim 16" is somewhat smaller than rim 16'. The upper part of the ring has the modified form shown at 27'.

Figure 5:
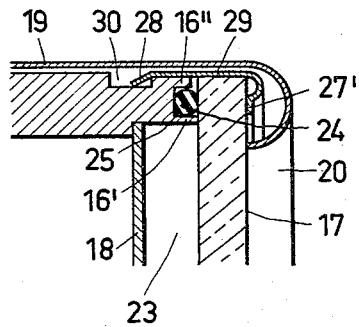
FIGURE 5 shows a special embodiment of a casing cover.

For mounting the manometer on a panel, cover sleeve 19 (FIG. 5) may be provided with a flange 32 with which it is fastened on the panel.

From the foregoing, it is believed that my invention may be readily understood by those skilled in the art without further description, it being borne in mind that numerous changes may be made in the details disclosed without departing from the spirit of the invention as set forth in the following claims.

I claim:

1. A manometer comprising a casing having an annular outer wall having an upper edge and a rear wall, pressure indicating elements within said casing and having a graduated dial, the casing being filled with a liquid to damp oscillations of the pressure indicating elements, a transparent covering disc placed in front of and spaced from said dial, a sealing element between the transparent disc and the upper edge of the casing, and a clamping ring slid over portions of the casing and the disc, said upper edge of the casing defining a first annular groove in which is positioned the said sealing element, the exterior of annular casing wall defining a second annular groove spaced from the said first groove longitudinally of the axis of the casing, said clamping ring having an external diameter which corresponds to the external diameter of the annular casing wall extending from the rear wall to the said second annular groove and having an internal diameter which corresponds to the external diameter of the annular casing wall extending from the said second annular groove to the said first annular groove and to the external diameter of the said transparent disc, said clamping ring having a rear end part and a front part, said rear end part being bent radially and inwardly into the said second annular groove and said front part being bent radially and inwardly over said transparent disc.

2. A manometer as defined in claim 1, wherein the said transparent cover disc consists of an elastic synthetic material.

3. A manometer as defined in claim 1, wherein the said first annular groove is radially open to the outside.

4. A manometer as defined in claim 1, wherein the said annular casing wall and the said clamping ring up to the said rear wall are covered by a sleeve having at the front side bent-over rim extending over the said front part of the said clamping ring.

5. A manometer as defined in claim 1, wherein the said sealing element consists of an O-ring of rubber.

6. A manometer as defined in claim 1, wherein the said first annular groove is limited by an inner rim and by an outer rim, the said outer rim being smaller than the inner rim.

References Cited

UNITED STATES PATENTS

| | | | |
|---|---|---|---|
| 2,714,469 | 8/1955 | Carlson. | |
| 2,811,619 | 10/1957 | Bourns et al. | |
| 3,053,094 | 9/1962 | Maugle | 73—431 |
| 3,080,758 | 3/1963 | Decker | 73—414 |

LOUIS R. PRINCE, *Primary Examiner.*

DANIEL M. YASICH, *Assistant Examiner.*